(12) United States Patent
Ku

(10) Patent No.: US 9,250,413 B2
(45) Date of Patent: Feb. 2, 2016

(54) VOICE COIL MOTOR AND LENS MODULE

(71) Applicant: HON HAI PRECISION INDUSTRY CO., LTD., New Taipei (TW)

(72) Inventor: Ping-Han Ku, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/067,959

(22) Filed: Oct. 31, 2013

(65) Prior Publication Data

US 2014/0355144 A1    Dec. 4, 2014

(30) Foreign Application Priority Data

May 29, 2013  (TW) .............................. 102118885 A

(51) Int. Cl.
*G02B 7/02* (2006.01)
*G02B 7/08* (2006.01)
*H02K 41/035* (2006.01)

(52) U.S. Cl.
CPC *G02B 7/025* (2013.01); *G02B 7/08* (2013.01); *H02K 41/0356* (2013.01)

(58) Field of Classification Search
USPC .......................... 359/811, 813, 815, 822–824
See application file for complete search history.

(56) References Cited

U.S. PATENT DOCUMENTS

| 8,319,886 | B1 * | 11/2012 | Wang et al. | 348/374 |
| 2009/0268311 | A1 * | 10/2009 | Ke | 359/704 |
| 2011/0241450 | A1 * | 10/2011 | Hsu | 310/12.16 |

* cited by examiner

*Primary Examiner* — Stephone B Allen
*Assistant Examiner* — Brandi Thomas
(74) *Attorney, Agent, or Firm* — Novak Druce Connolly Bove + Quigg LLP

(57) ABSTRACT

A voice coil motor (VCM) includes a fixing portion, a moving portion, a magnet assembly, a coil, and an elastic sheet. The fixing portion includes an upper plate and a sidewall extending from edges of the upper plate. The moving portion is received in the fixing portion, and includes a top surface and an outer surface connected to the top surface. The moving portion defines a plurality of glue receiving recesses in the top surface and a plurality of second connecting portions each extending from a bottom surface of each glue receiving recess. The magnet assembly is fixed on the inner surface. The coil is circled around the outer surface of the moving portion, and is opposite to the magnet assembly. The elastic sheet is connected between the first connecting portions and the second connecting portions.

14 Claims, 5 Drawing Sheets

VOICE COIL MOTOR AND LENS MODULE

BACKGROUND

1. Technical Field

The present disclosure relates to voice coil motors (VCMs) and, particularly, to a VCM avoiding glue from overflowing and a lens module using the VCM.

2. Description of Related Art

VCMs are used in lens modules for image focusing. Each VCM generally includes a moving portion, a fixing portion, and an elastic sheet connected between the moving portion and the fixing portion. The elastic sheet is generally connected to the fixing portion using glue. An amount of the glue must be enough to avoid the elastic sheet from being separated from the fixing portion. However, if the glue overflows to a space between the fixing portion and the moving portion, the result will be that the moving portion will not able to move relative to the fixing portion.

Therefore, it is desirable to provide a VCM that can overcome the limitations described.

DETAILED DESCRIPTION

Embodiments of the disclosure will now be described in detail, with reference to the accompanying drawings.

Figure 1:
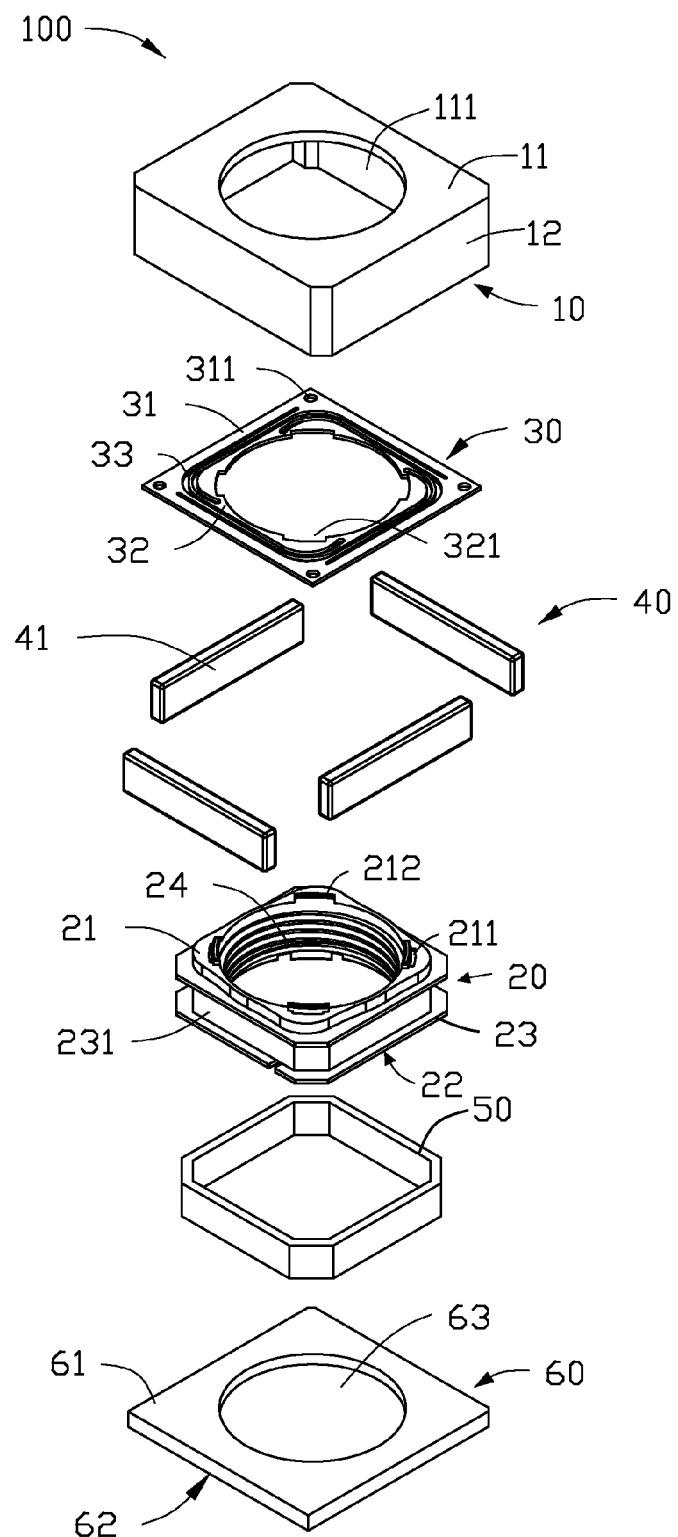
FIG. 1 is an isometric, exploded, and schematic view of a VCM in accordance with an exemplary embodiment.
Figure 2:
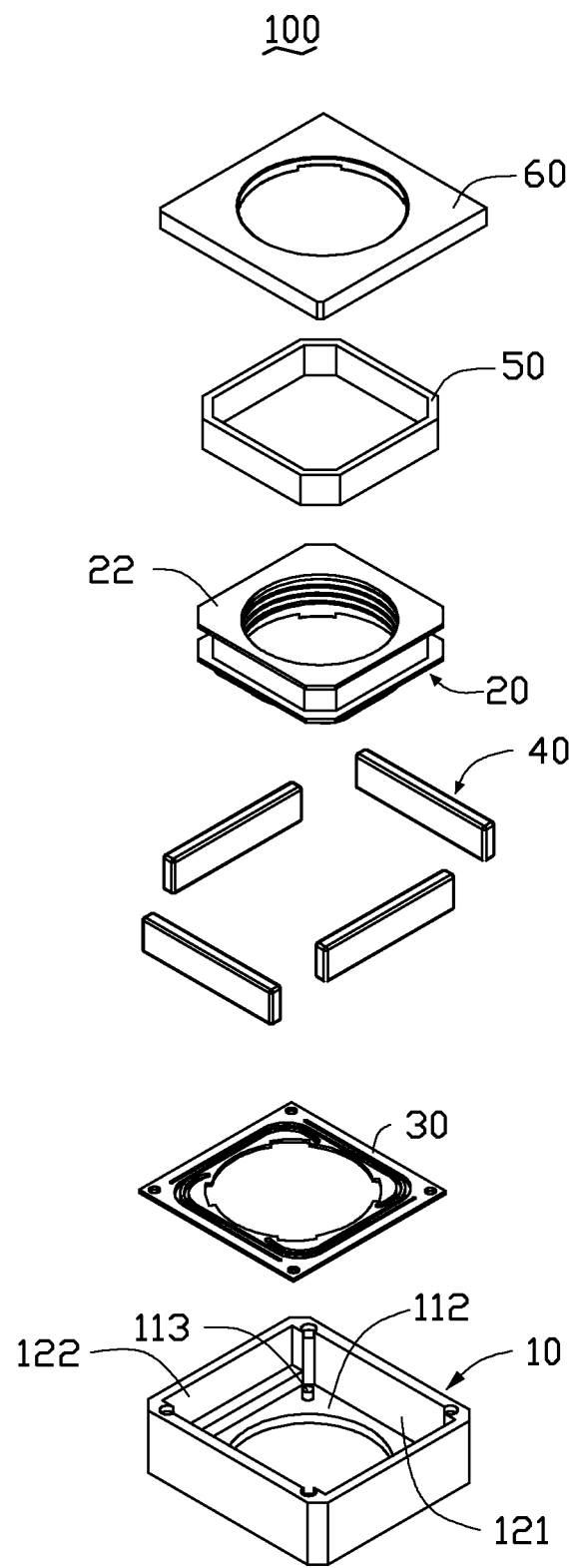
FIG. 2 is similar to FIG. 1, but viewed from another angle.

Referring to FIGS. 1-2, a voice coil motor (VCM) 100, according to an exemplary embodiment, includes a fixing portion 10, a moving portion 20, an elastic sheet 30, a magnet assembly 40, a coil 50, and a lower plate 60.

The fixing portion 10 is a cubic configuration, and includes an upper plate 11 and a sidewall 12 perpendicularly extending from peripheral edges of the upper plate 11. The upper plate 11 is rectangular, and defines a first through hole 111, substantially at a central portion of the upper plate 11. The upper plate 11 includes a lower surface 112. A number of first connecting portions 113 extend from corners of the lower surface 112. The sidewall 120 includes an inner surface 121. A number of first receiving recesses 122 are defined in the inner surface 122.

In the embodiment, the number of the first connecting portions 113 and the first receiving recesses 122 respectively are four. An extending direction of two opposite first receiving recesses 122 is substantially perpendicular to an extending direction of another two opposite first receiving recesses 122.

The moving portion 20 is a cubic configuration, and includes a top surface 21, a bottom surface 22, and an outer surface 23 connected between the top surface 21 and the bottom surface 22. The moving portion 20 defines a screw hole 24 penetrating the top surface 21 and the bottom surface 22, substantially at a central portion of the moving portion 20. A number of glue receiving recesses 211 are defined in the top surface 21 and are equidistantly arranged around the screw hole 24. A number of second connecting portions 212 extend from bottom surfaces of the glue receiving recesses 211. A cross-sectional area of the glue receiving recess 211 is greater than a cross-sectional area of the second connecting portion 212. The moving portion 20 defines a second receiving recess 231 in the outer surface 23, and the second receiving recess 231 surrounds the outer surface 23.

In this embodiment, the number of the glue receiving recesses 211 and the second connecting portions 212 respectively are four. An inner surface of each second connecting portion 212 and an inner surface of the screw hole 24 are coplanar.

The elastic sheet 30 can be formed by punching and are made of steel. The elastic sheet 30 is square-shaped and includes an outer portion 31, an inner portion 32, and a connection portion 33 connected between the outer portion 31 and the inner portion 32. The outer portion 31 defines a number of first fixing holes 311, substantially at corners. The inner portion 32 defines a number of second fixing holes 321. In this embodiment, the number of the first fixing holes 311 and the second fixing holes 321 respectively are four.

The magnet assembly 40 includes a number of magnets 41. Each magnet 41 is plate shaped, and respectively received in the first receiving recesses 122. In the embodiment, each magnet 41 is a permanent magnet, and the number of the magnets 41 is four.

The coil 50 is circled around the moving portion 20 and is received in the second receiving recess 231. The coil 50 is electrically connected to a power source. The coil 50 generates a magnetic field when a current flows through the coil 50.

The lower plate 60 is square-shaped, and includes a first surface 61 and a second surface 62 opposite to the first surface 61. The lower plate 60 defines a through hole 63 penetrating the first surface 61 and the second surface 62, substantially at a central portion of the lower plate 60.

Figure 3:
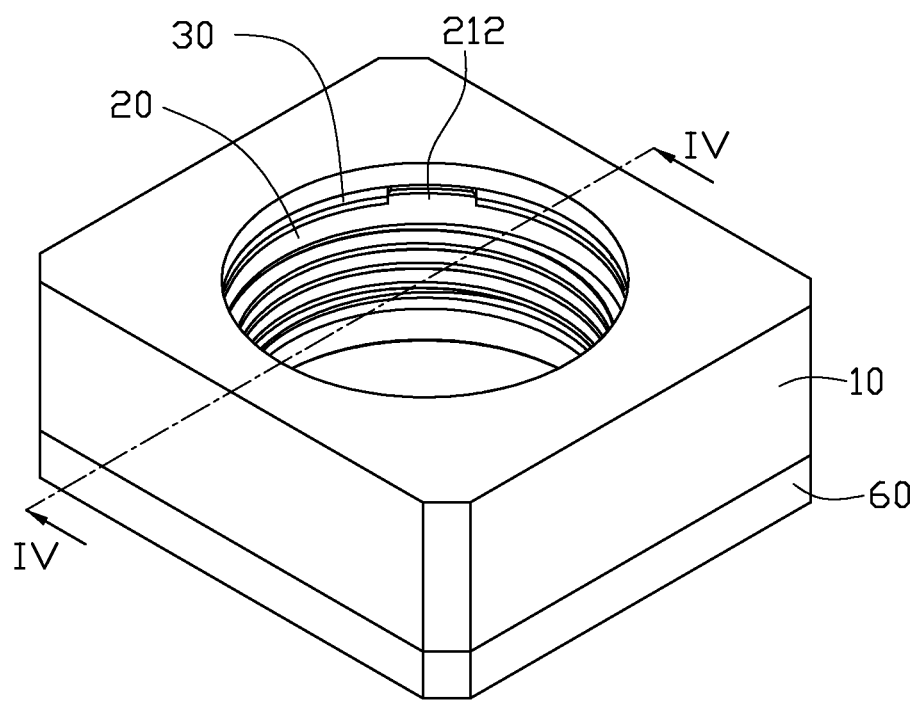
FIG. 3 is an assembled view of the VCM of FIG. 1.
Figure 4:
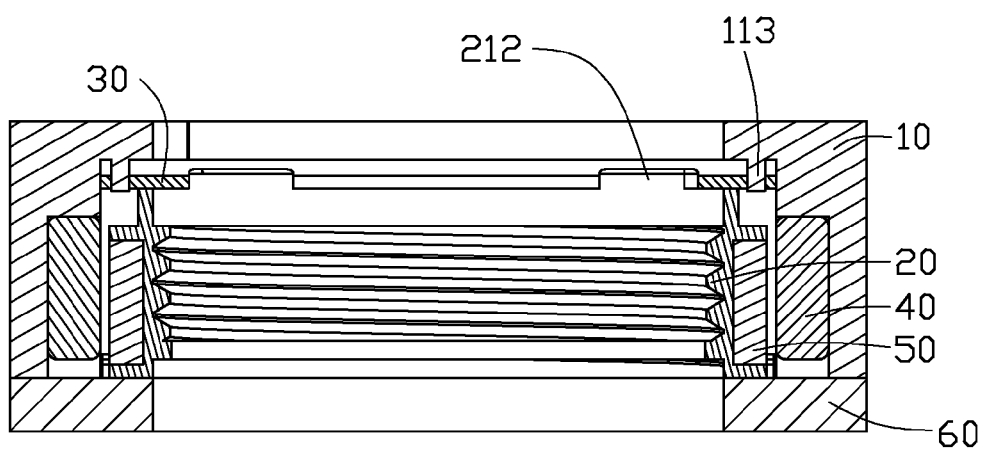
FIG. 4 is a cross-sectional view taken along a line IV-IV of FIG. 3.

Referring to FIGS. 3-4, in assembly, the elastic sheet 30 is interconnected with the fixing portion 10 and the moving portion 20. The first connecting portions 113 of the upper plate 11 are respectively received in the first fixing holes 311 of the elastic sheet 30, and the second connecting portions 212 of the moving portion 20 are respectively received in the second fixing holes 321 of the elastic sheet 30. The first connecting portions 113 and the second connecting portions 212 are firmly connected to the elastic sheet 30 with glue. When the glue bonding between the second connecting portions 212 and the elastic sheet 30 overflows from the second connecting portions 212, the glue will be received in the glue receiving recesses 211. The moving portion 20 is received in the fixing portion 10, and the coil 50 is opposite to the magnet assembly 40. The sidewall 12 of the fixing portion 10 is positioned on the lower plate 60, and the fixing portion 10 is sealed by the sidewall 12.

During the focusing process, the coil 50 circling the moving portion 20 is supplied with a current, the coil 60 generates a magnet field according to a principle of electromagnetic induction. The moving portion 20 is driven to move along the optical axis by a magnetic force between the coil 60 and the magnet assembly 40 fixed on the fixing portion 10.

Figure 5:
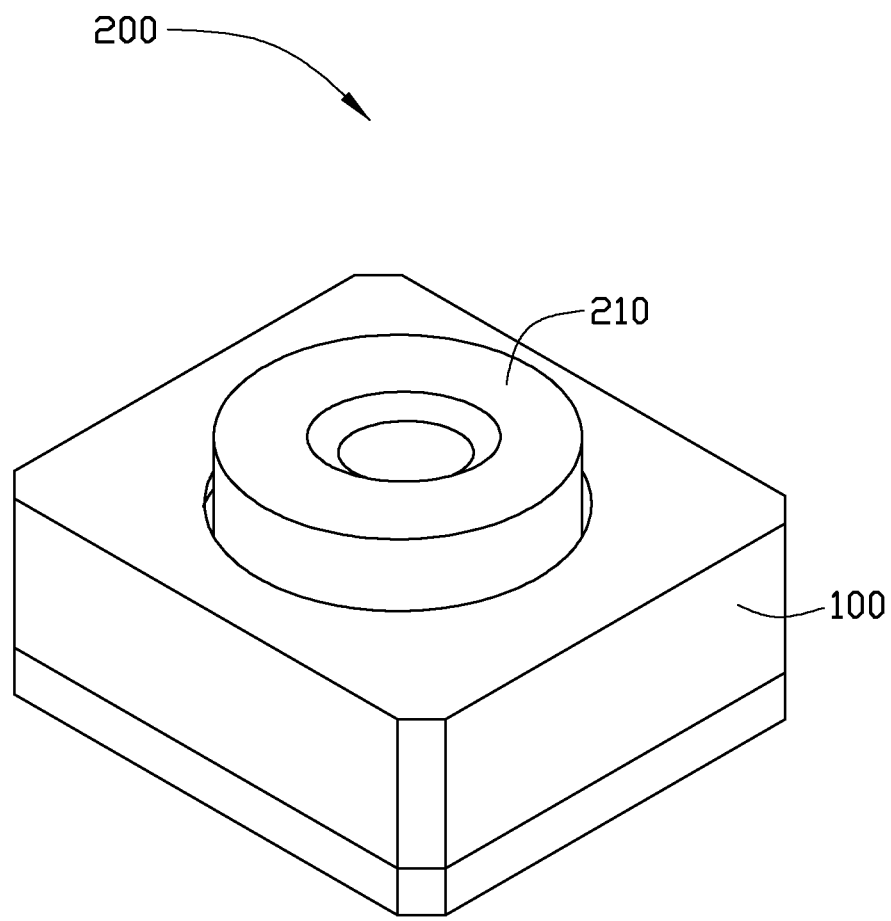
FIG. 5 is an assembled view of a lens module using the VCM of FIG. 1.

Referring to FIG. 5, a lens module 200, according to an exemplary embodiment, includes the VCM 100 and a lens module 210. The lens module 210 is screwed in the screw hole 24 of the moving portion 20.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A voice coil motor (VCM), comprising:

a fixing portion comprising an upper plate and a sidewall extending from edges of the upper plate; the upper plate comprising a lower surface and a plurality of first connecting portions extending from the lower surface; the sidewall comprising an inner surface;

a moving portion received in the fixing portion, and comprising a top surface and an outer surface connected to the top surface; the moving portion defining a plurality of glue receiving recesses in the top surface and a plurality of second connecting portions each extending from a bottom surface of each glue receiving recess; a cross-sectional area of the glue receiving recess being greater than a cross-sectional area of the second connecting portion along the width direction of the second connecting portion;

a magnet assembly fixed on the inner surface;

a coil circled around the outer surface of the moving portion and opposite to the magnet assembly; and an elastic sheet connected between the first connecting portions and the second connecting portions.

2. The VCM of claim 1, wherein the sidewall defines a plurality of first receiving recesses in the inner surface, the magnet assembly comprises a plurality of magnets, the magnets are respectively received in the first receiving recesses.

3. The VCM of claim 1, wherein the moving portion defines a second receiving recess in the outer surface, the second receiving recess surrounds the outer surface, the coil is circled around the moving portion and is received in the second receiving recess.

4. The VCM of claim 3, wherein the elastic sheet comprises an outer portion, an inner portion, and a connection portion connected between the outer portion and the inner portion, the outer portion is connected to the upper plate, and the inner portion is connected to the moving portion.

5. The VCM of claim 4, wherein the outer portion defines a plurality of first fixing holes, the inner portions define a plurality of second fixing hole, the first connecting portions are respectively received in the first fixing holes, the second connecting portions are respectively received in the second fixing holes.

6. The VCM of claim 5, wherein the first connecting portions and the second connecting portions are connected to the elastic sheet with glue.

7. The VCM of claim 1, further comprising a lower plate, wherein the sidewall is positioned on the lower plate.

8. A lens module, comprising:

a voice coil motor (VCM), comprising:

a fixing portion comprising an upper plate and a sidewall extending from edges of the upper plate; the upper plate comprising a lower surface and a plurality of first connecting portions extending from the lower surface; the sidewall comprising an inner surface;

a moving portion received in the fixing portion, and comprising a top surface, a bottom surface, and an outer surface connected between the top surface and the bottom surface; the moving portion defining a screw hole penetrating the top surface and the bottom surface; the moving portion defining a plurality of glue receiving recesses in the top surface and a plurality of second connecting portions each extending from a bottom surface of each glue receiving recess; a cross-sectional area of the glue receiving recess being greater than a cross-sectional area of the second connecting portion along the width direction of the second connecting portion;

a magnet assembly fixed on the inner surface;

a coil circled around the outer surface of the moving portion and opposite to the magnet assembly; and an elastic sheet connected between the first connecting portions and the second connecting portions;

a lens module received in the screw hole of the moving portion.

9. The lens module of claim 8, wherein the sidewall defines a plurality of first receiving recesses in the inner surface, the magnet assembly comprises a plurality of magnets, the magnets are respectively received in the first receiving recesses.

10. The lens module of claim 8, wherein the moving portion defines a second receiving recess in the outer surface, the second receiving recess surrounds the outer surface, the coil is circled around the moving portion and is received in the second receiving recess.

11. The lens module of claim 10, wherein the elastic sheet comprises an outer portion, an inner portion, and a connection portion connected between the outer portion and the inner portion, the outer portion is connected to the upper plate, and the inner portion is connected to the moving portion.

12. The lens module of claim 11, wherein the outer portion defines a plurality of first fixing holes, the inner portions define a plurality of second fixing hole, the first connecting portions are respectively received in the first fixing holes, the second connecting portions are respectively received in the second fixing holes.

13. The lens module of claim 12, wherein the first connecting portions and the second connecting portions are connected to the elastic sheet with glue.

14. The lens module of claim 9, further comprising a lower plate, wherein the sidewall is positioned on the lower plate.

* * * * *